United States Patent
Horton et al.

(10) Patent No.: US 7,414,574 B2
(45) Date of Patent: Aug. 19, 2008

(54) DETECTING AN OSCILLATION CONDITION IN A GNSS DISTRIBUTION SYSTEM

(75) Inventors: Robert Ray Horton, Pueblo West, CO (US); Phillip Wayne Coiner, Pueblo, CO (US)

(73) Assignee: GPS Source, Inc., Pueblo, CO (US)

( * ) Notice: Subject to any disclaimer, the term of this patent is extended or adjusted under 35 U.S.C. 154(b) by 34 days.

(21) Appl. No.: 11/379,377

(22) Filed: Apr. 19, 2006

(65) Prior Publication Data

US 2006/0256004 A1 Nov. 16, 2006

Related U.S. Application Data

(60) Provisional application No. 60/672,869, filed on Apr. 20, 2005.

(51) Int. Cl.
*G01S 5/14* (2006.01)
(52) U.S. Cl. .............................. 342/357.02; 342/357.06
(58) Field of Classification Search ............ 342/357.02, 342/357.06, 357.1, 357.12; 701/213, 215
See application file for complete search history.

(56) References Cited

U.S. PATENT DOCUMENTS

| 6,711,230 | B1 * | 3/2004 | Nicholls et al. | ............. 375/376 |
| 6,946,989 | B2 * | 9/2005 | Vavik | .......................... 342/51 |
| 2003/0137446 | A1 * | 7/2003 | Vavik | .......................... 342/51 |
| 2006/0038719 | A1 * | 2/2006 | Pande et al. | ............ 342/357.12 |
| 2006/0262006 | A1 * | 11/2006 | Vavik | .......................... 342/51 |

\* cited by examiner

*Primary Examiner*—Dao L Phan
(74) *Attorney, Agent, or Firm*—Banner & Witcoff, Ltd (57) ABSTRACT

A system and method is provided for detecting spurious frequency oscillations within Global Navigation Satellite System (GNSS) signal distribution networks. Power levels of Radio Frequency signals within a GNSS signal distribution network are measured or detected to exceed a threshold and compared to levels known to exceed the GNSS signals level of a properly operating system. A system and method is provided for disabling the conditions enabling spurious frequency oscillations when such conditions are detected.

24 Claims, 9 Drawing Sheets

DETECTING AN OSCILLATION CONDITION IN A GNSS DISTRIBUTION SYSTEM

RELATED APPLICATION INFORMATION

This application claims priority to U.S. Ser. No. 60/672,869, filed Apr. 20, 2005, whose contents are expressly incorporated herein by reference.

TECHNICAL FIELD

Aspects of the invention generally relate to global navigation satellite systems. More specifically, the present invention relates to enhancing the operation of GPS or more generally GNSS satellite signal distribution networks.

RELATED ART

Global Navigation Satellite System (GNSS) is a term used generally to describe radio navigation satellite systems that orbit the earth and emit reference signals that enable certain types of radio navigation receivers to determine their location on or near the surface of the earth. For example, the Global Positioning System (GPS) is a GNSS currently in use by the United States. In addition to the GPS system, there are other similar GNSS systems that currently perform or, in the future, will perform similar functions. These systems include the European Union's Galileo system, the Russian Federation's GLONASS system, and the Japanese Quasi-Zenith Satellite System (QZSS).

GNSSs emit radio frequency (RF) signals that, when received and processed, can provide location and navigation services to individual persons for recreational uses, to commercial entities for use in "for profit" activities, to government and military entities for navigation of weapon systems and to public safety organizations to assist in directing emergency personnel. In one example, many modern vehicle manufacturers incorporate GPS navigation systems in commercial vehicles to guide drivers in unfamiliar areas. Similarly, GPS type devices have also been adapted to cell phone technology so that rescue personnel are able to locate a missing or lost individual in emergency situations.

GNSS satellite systems typically operate at mid-earth orbits (approximately 10,900 nautical miles high) and at Geosynchronous orbits (approximately 19,300 nautical miles high). Due to the altitude of these satellite systems, the signals are very weak when they reach the surface of the earth. In order to enable the design of small antennas with high gain, frequencies for GNSS satellite transmission are typically chosen in the L bands (approximately 1 GHz to 2 GHz). The disadvantage of this frequency choice is that systems operating at this frequency generally operate by line of sight. That is, L band frequencies exhibit poor signal penetration into dense building materials or earth. Thus, there are many locations, such as large manufacturing facilities, aircraft maintenance facilities, fire and EMS garages, etc. where it is desirable for GNSS receivers to operate but where the GNSS satellite signals are typically not available. Such lack of availability of GNSS satellite signals can preclude testing and maintenance of GPS enabled systems (e.g. GPS product manufacturing facilities or aircraft maintenance facilities) or, in the case of Fire and EMS vehicles, can result in mission critical GPS receivers growing "cold", which in turn can result in lost response time as the vehicle waits for GPS receivers re-acquire upon departing the garage. These limitations are routinely addressed by way of a GNSS signal distribution network in the facility which provides for enhanced indoor GNSS signal coverage, enabling these GNSS applications to operate in locations where the GNSS signals would not otherwise be available.

Indoor GNSS signal distribution networks may be realized by a GNSS receive antenna and a coaxial cable distribution network, possibly including amplification stages and signal dividers. Indoor GNSS signal distribution networks may also be realized by a GNSS receive antenna, a coaxial cable distribution network, which may or may not including amplification stages and signal divider networks, and a GNSS transmitter device that re-radiates the GNSS signal. In these realizations of indoor GNSS signal distribution networks, significant amplification of the GNSS signal is very likely. If not implemented properly, such high gain signal amplification stages have the potential to encounter positive feedback conditions with greater than unity gain, resulting in undesired spurious frequency oscillations. When such spurious frequency oscillations occur, operation of the indoor GNSS receivers is disrupted. In the case of the GNSS re-radiator systems, spurious frequency oscillations may be radiated into free space. Such unintentional radiated spurious emissions may disrupt the operation of GNSS receivers or other Radio Frequency devices far beyond the range of the GNSS signal distribution network.

SUMMARY

Aspects of the present invention address one or more of the issues mentioned above, thereby providing for reliable operation of GNSS signal distribution networks without the potential for harmful interference due to spurious frequency oscillations. At least one aspect of the present invention provides a spurious frequency oscillation detection system to indicate when conditions exist for spurious frequency oscillations to occur within the GNSS signal distribution network. Another aspect of the present invention provides for a system to disable the GNSS signal distribution network when the conditions exist for spurious frequency oscillations to occur. Still another aspect of the present invention provides for a system and method to maintain the disabled state of the GNSS signal distribution network until the conditions for spurious frequency oscillations are removed. One or more aspects of the present invention described above or below can enhance the reliable operation of GNSS signal distribution networks without the threat of spurious frequency oscillations within the network disrupting the operation of GNSS receivers and/or other Radio Frequency devices operating in conjunction with the network and/or in the geographic vicinity of the network.

These and other aspects of the invention are addressed in relation to the Figures and related description.

BRIEF DESCRIPTION OF THE DRAWINGS

The foregoing summary of the invention, as well as the following detailed description of the preferred embodiments, is better understood when read in conjunction with the accompanying drawings, which are included by way of example, and not by way of limitation with regard to the claimed invention.

DETAILED DESCRIPTION

Aspects of the present invention will now be described more fully hereinafter with reference to the accompanying drawings, in which various aspects of the invention are shown. This invention may, however, be embodied in different forms and should not be construed as limited to the embodiments set forth herein. Rather, the embodiments are provided so that this disclosure will be thorough and complete, and will fully convey the scope of the invention to those skilled in the art. The elements and drawings are not necessarily to scale, emphasis instead being placed upon clearly illustrating the principals of the present invention.

It is noted that various connections are set forth between elements in the following description. It is noted that these connections in general and, unless specified otherwise, may be direct or indirect and that this specification is not intended to be limiting in this respect.

Figure 1:
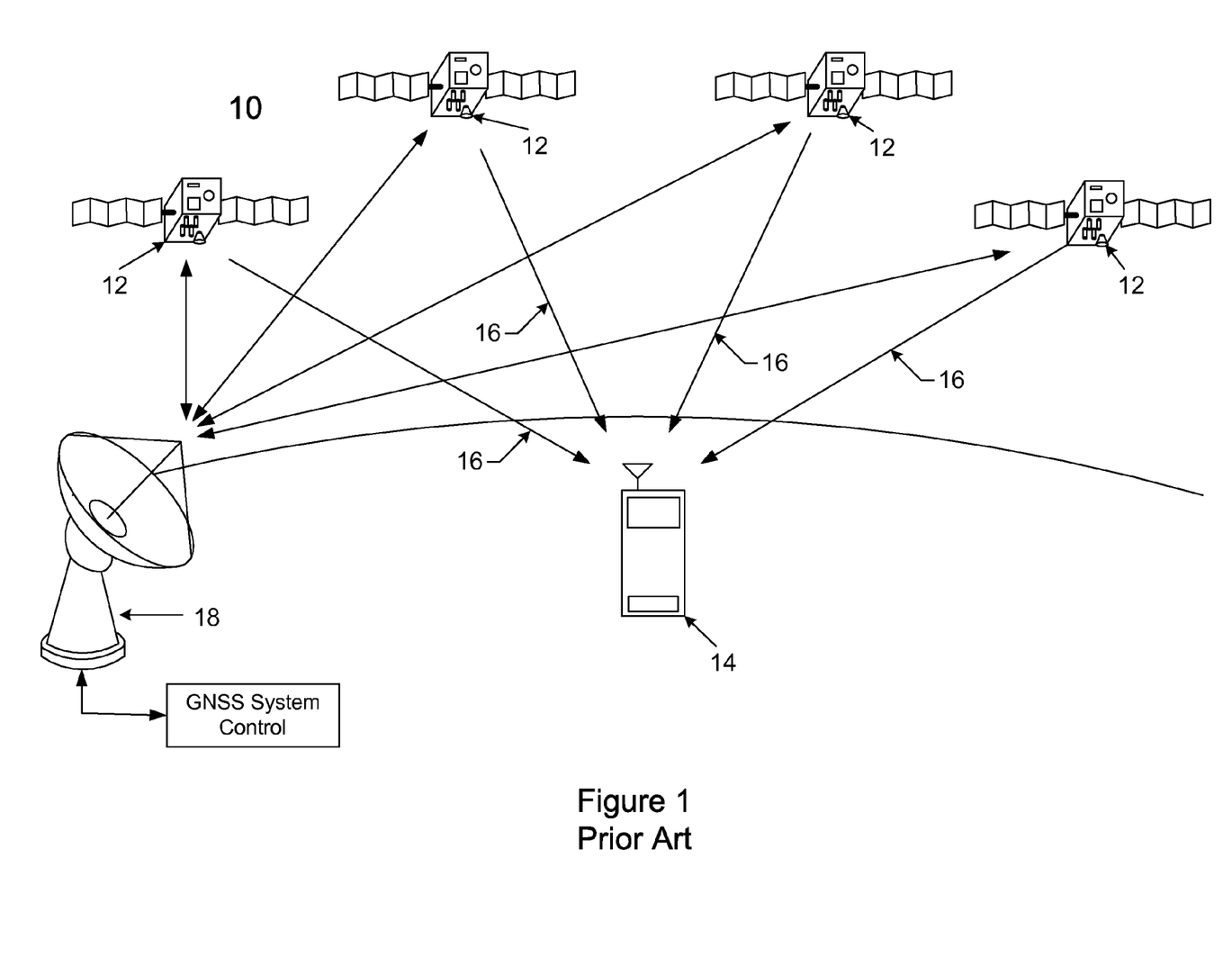
FIG. 1 illustrates a conventional Global Navigation Satellite System (GNSS) that may support one or more aspects of the present invention.

FIG. 1 illustrates a conventional Global Navigation Satellite System (GNSS) 10 that may support one or more aspects of the present invention. GNSS systems are space-based triangulation systems that consist of multiple radio navigation satellites 12 and a ground control segment 18. The satellites 12 support the operation of navigation and location receivers 14, e.g., a radio receiver with a time correlator processor, by the continuous transmission of radio navigation signals 16. GNSS receivers 14 operate by receiving these radio signals from the satellites and, using a time correlation process, measure the time it takes for the signals 16 to travel from the GNSS satellites 12 to the receiver's location. By multiplying the travel time by the speed of light, the receiver 14 can determine the range to the satellite and thereby determine its location through triangulation.

Figure 2:
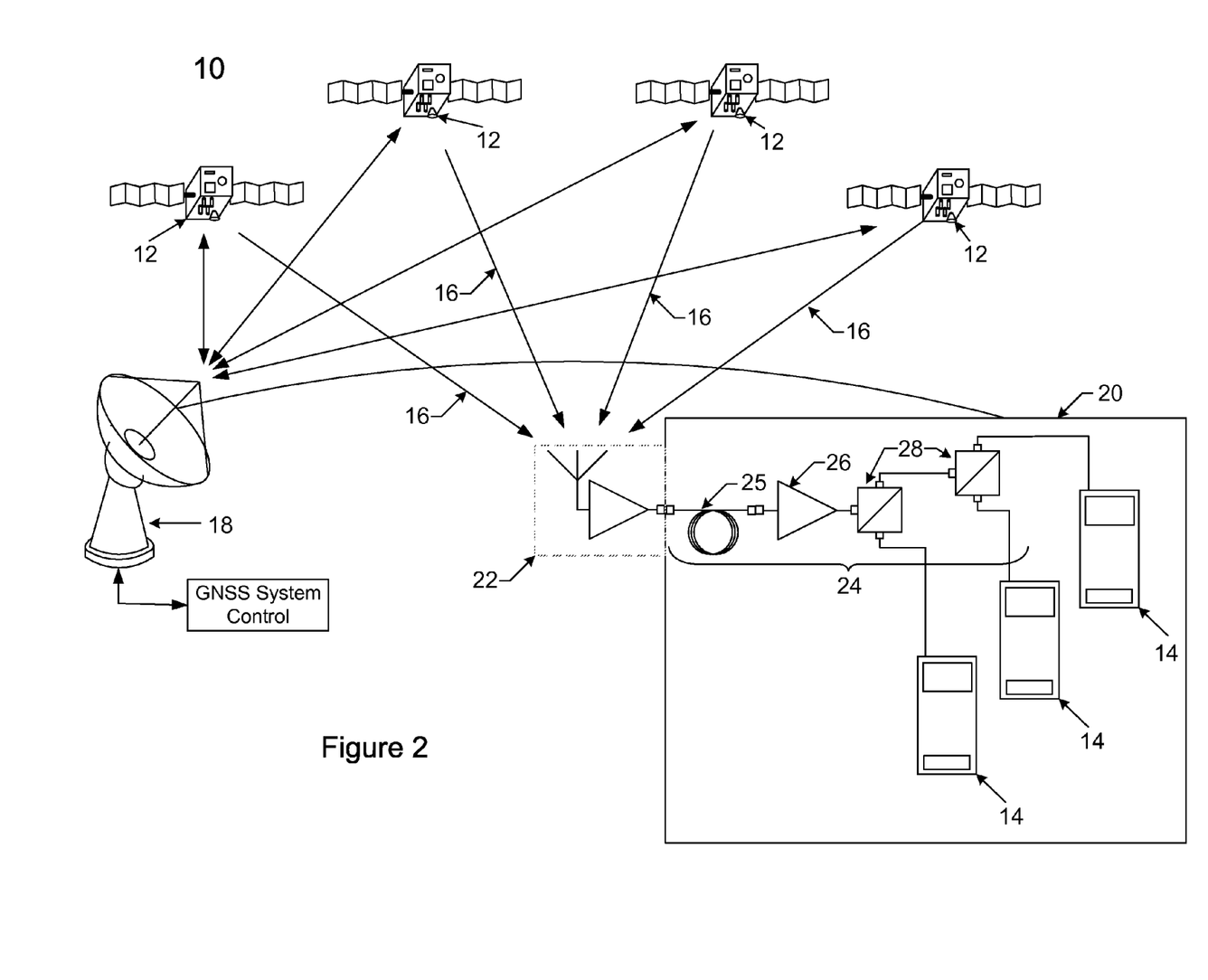
FIG. 2 illustrates a GNSS system operating in conjunction with a coaxial cable example of a GNSS signal distribution network and one or more GNSS receivers.
Figure 3:
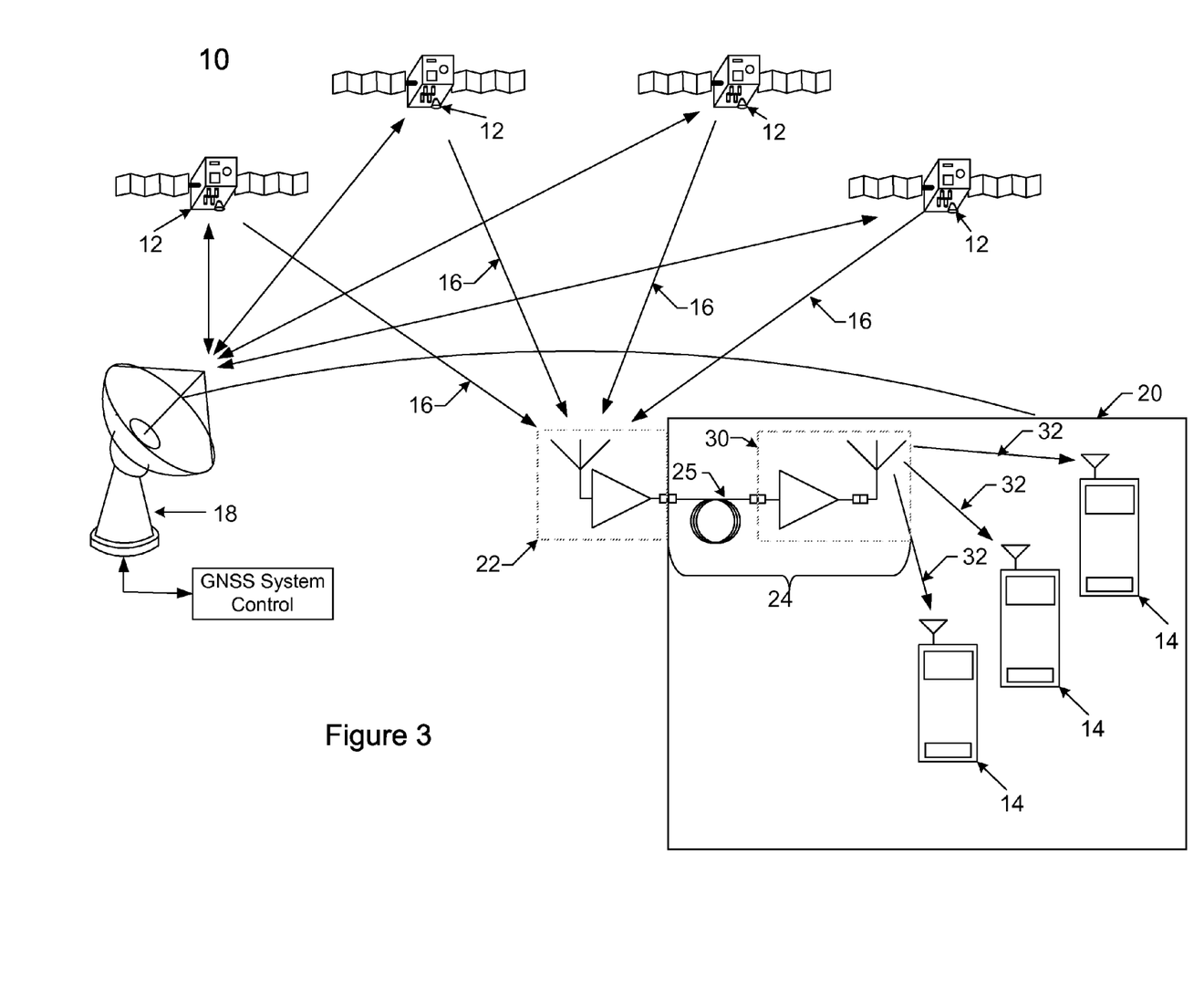
FIG. 3 illustrates a GNSS system operating in conjunction with a GNSS re-radiator example of a GNSS signal distribution network and one or more GNSS receivers.

FIGS. 2 and 3 illustrate a GNSS system 10 operating in conjunction with either a coaxial cable example, FIG. 2, or a re-radiator example, FIG. 3, of a GNSS signal distribution network 24 and one or more GNSS receivers 14, allowing the GNSS receivers 14 to operate inside of a structure or obstacle 20 where the GNSS signals would otherwise be unavailable. In these configurations, the radio navigation signals 16 from the radio navigation satellites 12 are collected by the GNSS signal distribution network receive antenna 22. In the case of the coaxial cable example, FIG. 2, the radio navigation signals 16 are distributed throughout the network 24 to the GNSS receivers 14 by way of coaxial cables 25, wherein the network 24 may or may not including amplification stages 26 and signal divider networks 28. In the case of the re-radiator example as shown in FIG. 3, the radio navigation signals 16 are distributed to the GNSS receivers 14 by way of coaxial cables 25 and a GNSS transmitter device 30 that re-radiates the combined GNSS signals 32. The GNSS re-radiator example of a GNSS signal distribution system may or may not include amplification stages 26 and signal divider networks 28. In either case, the GNSS receivers 14 receive the radio navigation signals 16, enabling the receivers to process the signals and to operate in spite of the obstruction 20, enabling possible testing and/or maintenance of GNSS enabled systems (e.g. GPS product manufacturing facilities or aircraft maintenance facilities) or, in the case of Fire and EMS vehicles, preventing mission critical GNSS receivers from growing "cold", which in turn can result in zero re-acquisition delay as the vehicle departs the garage, saving valuable response time.

While FIGS. 2 and 3 describe coaxial and re-radiation systems to transfer or distribute GNSS signals, other distribution or transmission pathways are included within the scope of the invention including but not limited to fiber optic transmission pathways (including light emitters and receivers) and frequency shifting transmission pathways (including frequency shifters to raise or lower the frequencies of the GNSS signals so subsequent transmission of the data of the GNSS signals does not interfere with other GNSS receivers), and the like. For instance, one may shift the GNSS signals to unregulated frequencies such as the 2.4 GHz frequency band.

Figure 4:
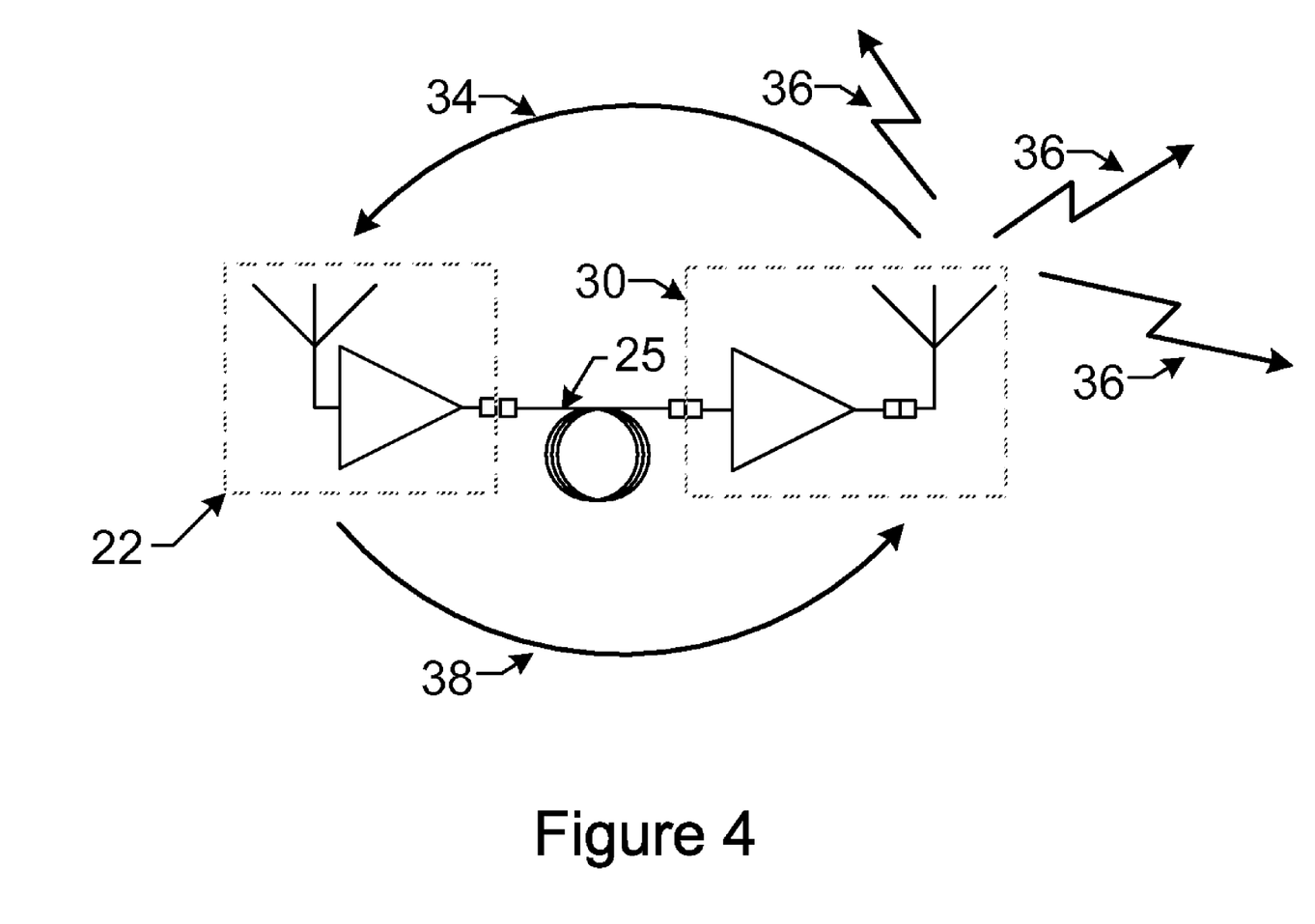
FIG. 4 illustrates a GNSS signal distribution system wherein the potential for harmful interference due to spurious frequency oscillations exists.

In the course of manufacturing components of GNSS signal distribution networks, the installation of GNSS signal distribution networks, or the operation of GNSS signal distribution networks, events may transpire wherein the high gain amplification stages of the of GNSS signal distribution network encounter positive feedback conditions with greater than unity gain, potentially resulting in undesirable spurious frequency oscillations. With reference to FIG. 4, and by way of example, a re-radiator example of a GNSS signal distribution network in which conditions exist for spurious frequency oscillations is shown. This realization of a GNSS signal distribution network includes a GNSS receive antenna 22, which may include amplification, a coaxial cable 25, and a GNSS transmitter device 30 that re-radiates the combined GNSS signals. In this example, the GNSS transmitter device 30 may include an amplification stage and a transmit antenna. If the signal gain through the forward path 38 exceeds the signal isolation loss 34 from the transmit antenna back to the receive antenna, the system is described as having closed loop gain that exceeds unity. This condition may exist when the transmit antenna is mounted in a location with close proximity to the receive antenna. When such conditions exist, low level noise in the system may be continuously amplified at the frequency of the system's optimum closed loop gain. These spurious frequency oscillations may tend to grow until the signal amplification stages reach saturation, resulting in a radio frequency power level for the undesired spurious frequency oscillations that is far greater in radio frequency power than is the desired GPS signal. When such spurious frequency oscillations exist within this system, spurious radiated emissions 36 may be radiated into free space, disrupting the operation of GNSS receivers or other Radio Frequency devices in the proximity and beyond the range of the GNSS signal distribution network.

In a similar manner, positive feedback conditions may exits within any GNSS signal distribution network that includes amplification stages, resulting in the creation of spurious frequency oscillations. Although coaxial cable examples of GNSS signal distribution network are unlikely to result in spurious radiated emissions 36, operation of GNSS receivers 14 that are intended to operate with the network will be disrupted.

Figure 5:
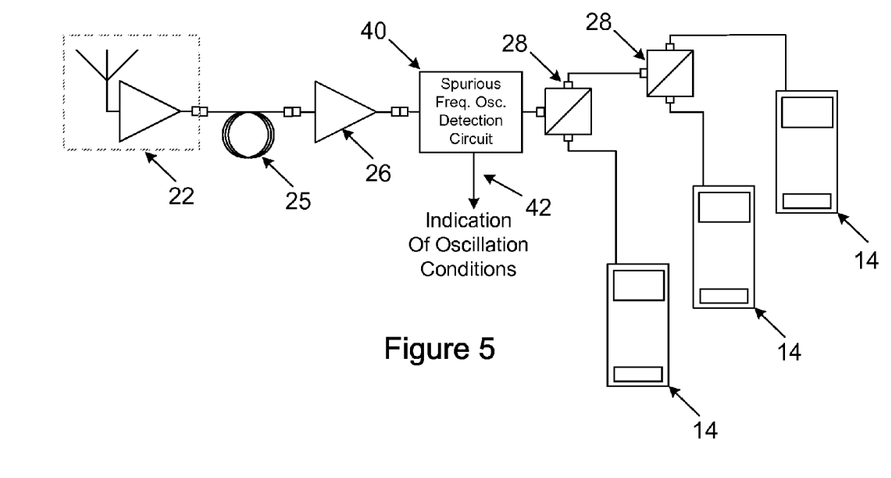
FIG. 5 illustrates a coaxial cable example of a GNSS signal distribution network including a system for detecting and indicating the existence of spurious oscillations according to one or more illustrative embodiments of the present invention.
Figure 6:
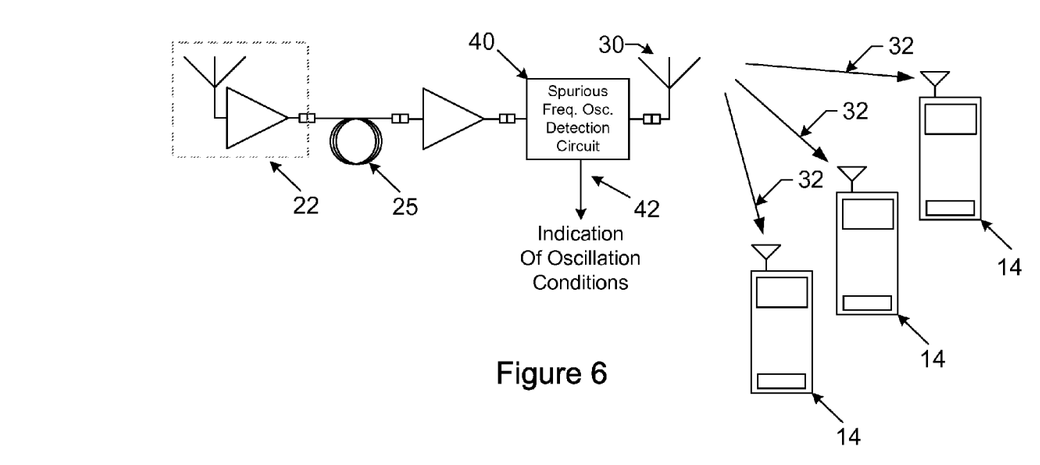
FIG. 6 illustrates a GNSS re-radiator example of a GNSS signal distribution network including a system for detecting and indicating the existence of spurious oscillations according to one or more illustrative embodiments of the present invention.

With reference to FIGS. 5 and 6, a spurious frequency oscillation detection circuit 40 serves as a system for detection and indication 42 of oscillation conditions. FIG. 5 illustrates the system for detection and indication of spurious frequency oscillation in a coaxial cable example of a GNSS signal distribution network. FIG. 6 illustrates the system for detection and indication of spurious frequency oscillation in a re-radiator example of a GNSS signal distribution network. In both examples, the system for detection and indication of spurious frequency oscillations is placed in the common Radio Frequency signal path so as to measure or detect the presence of the undesirable oscillations.

Figure 7:
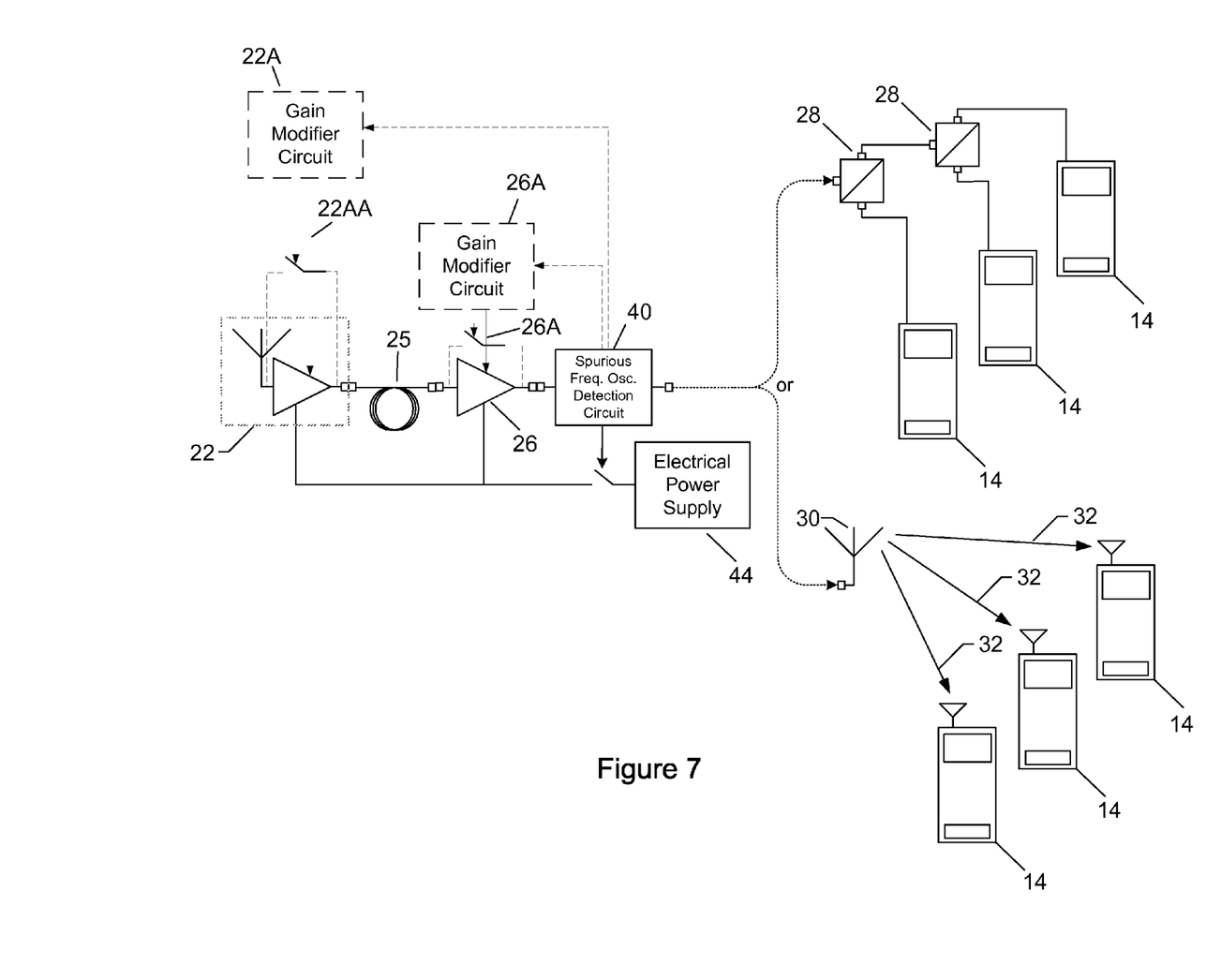
FIG. 7 illustrates the GNSS signal distribution network of either a coaxial cable example or a re-radiator example, further illustrating a system for disabling the GNSS signal distribution network when the conditions exist for spurious oscillations to occur.

With reference to FIG. 7, the example of the system for detection and indication of spurious frequency oscillations 40 further includes a system to disable the GNSS signal distribution network and eliminate the conditions for spurious frequency oscillations, preventing further disruption of GNSS receivers 14 within the network, or in the case of the re-radiator example, preventing interference with other Radio Frequency devices in the vicinity of the network. In this embodiment, the system to disable the GNSS signal distribution network and eliminate the conditions for spurious frequency oscillations is realized by a switch to remove electrical power from one or more of the amplification stages of the GNSS signal distribution network. With electrical power removed from the amplification stages, the conditions creating a closed loop gain exceeding unity are removed and the spurious frequency oscillations can be reduced or eliminated from the system.

By removing power to an amplification pathway (possibly including one or more amplifiers), the pathway causing the spurious feedback oscillations may be modified to reduce or eliminate the oscillations. Removing power from the pathway may disable the pathway for the transmission of GNSS signals. This approach prevents the transmission of the oscillations by preventing the transmission of any signal.

Alternatively, the amplification pathway may be modified as shown by gain modifier circuitry 22a and 26a that remove the amplifier 22 and/or 26 from the gain pathway. The circuitry 22a and/or 26a may receive an oscillation detection from circuit 40 and short the gain from their respective amplifier to 0 (via a short circuit for example). One benefit of shorting an amp is the ability to maintain the operation of the overall circuit despite the removal of the amplifier. This aspect may operate independently or in conjunction with the elimination of power from power supply 44.

Further, circuitry 22a and/or 26a may alternatively or additionally have a gain control ability (represented by connection 22aa and 26aa respectively) that modifies the gain of the amplifier 22 or 26. The modified gain may be any range so as to reduce or eliminate the oscillations detected by detector 40. The gain modifier circuitry 22a and 26a may operate alone or together to reduce amplification of two or more amps. The modification of the gain of amplifiers is known to those of ordinary skill in the art and may include, for instance, changing the bias via voltage control, current control, or signal level (binary or otherwise) and the like.

Figure 8:
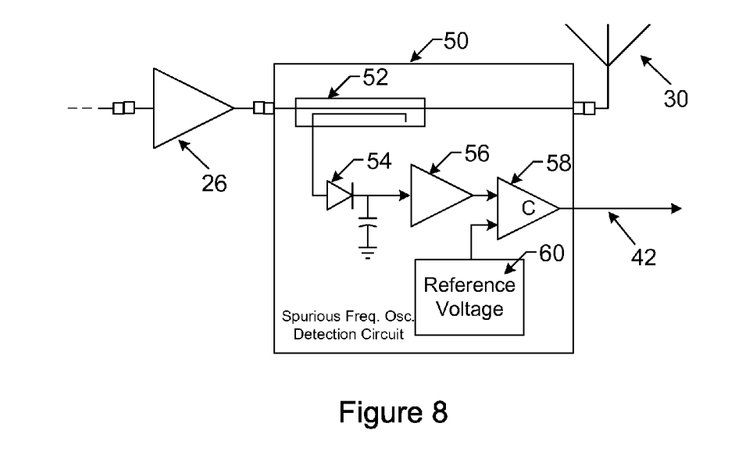
FIG. 8 illustrates a first illustrative example of a system for detection of spurious oscillations in the GNSS signal distribution network.

As described previously, when the conditions for positive feedback with greater than unity gain exist, the amplitude of the spurious frequency oscillations will tend to grow until the signal amplification stages reach saturation, resulting in a radio frequency power level for the undesired spurious frequency oscillations that is far greater than the radio frequency power of the desired GNSS signal. One possible example for detection of the presence of spurious frequency oscillations is to incorporate a circuit that measures the radio frequency power levels within the GNSS signal distribution system and indicates the presence of spurious frequency oscillations when a radio frequency power level is detected that is significantly greater than what would be expected for the desired GNSS signal. Alternatively, the circuit may detect when the frequency oscillations exceed a predefined level. With reference to FIG. 8, a potential system for detection and indication of spurious frequency oscillations 50 is described. In this embodiment of the present invention, a circuit for measuring or detecting the radio frequency power levels within the GNSS signal distribution system may include a Radio Frequency (RF) power coupler 52, and an RF peak detector 54. In this example, a small percentage of the signals present in the GNSS signal distribution system are sampled by the RF power coupler 52. These signals are then applied to the RF peak detector 54 which will create a small DC voltage that corresponds to the level of the RF energy from the power coupler 52. Because the DC voltage representing the RF power levels in the GNSS signal distribution are very small, an amplifier 56 may be used to increase the voltage levels from the peak detector 54 to a level that may be compared to an established threshold voltage in a voltage comparator 58. When the voltage from the amplifier 56 exceeds the pre-established reference voltage 60, the output of the comparator 58 will transition to a "high" logic level, providing an indication 42 that spurious frequency oscillations exist.

Figure 9:
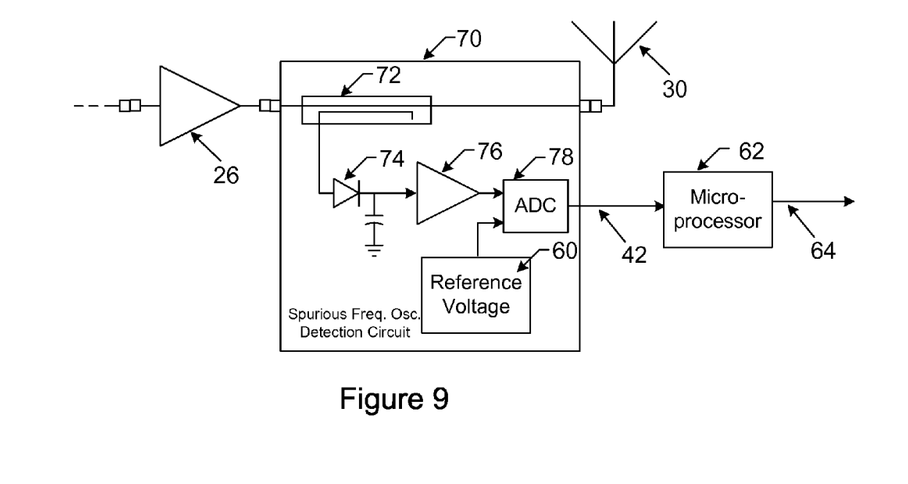
FIG. 9 illustrates another illustrative example for detection of spurious oscillations in the GNSS signal distribution network.

FIG. 9 illustrates a similar example wherein the voltage comparator is replaced with an Analog-to-Digital Converter (ADC) 78. In this example, a microprocessor 62 may be used to read the output 42 of the Analog-to-Digital Converter 78. The microprocessor may further compare the ADC reading to a pre-established value which would represent an RF power level significantly greater than the levels that would be expected in the GNSS signal distribution network where it operating properly. If the ADC reading exceeds the pre-established value, the presence of spurious frequency oscillations may be established and the microprocessor may be programmed to take additional actions 64, e.g. a binary output to control a switch, to remove the conditions contributing to the creation of spurious frequency oscillations.

Figure 10:
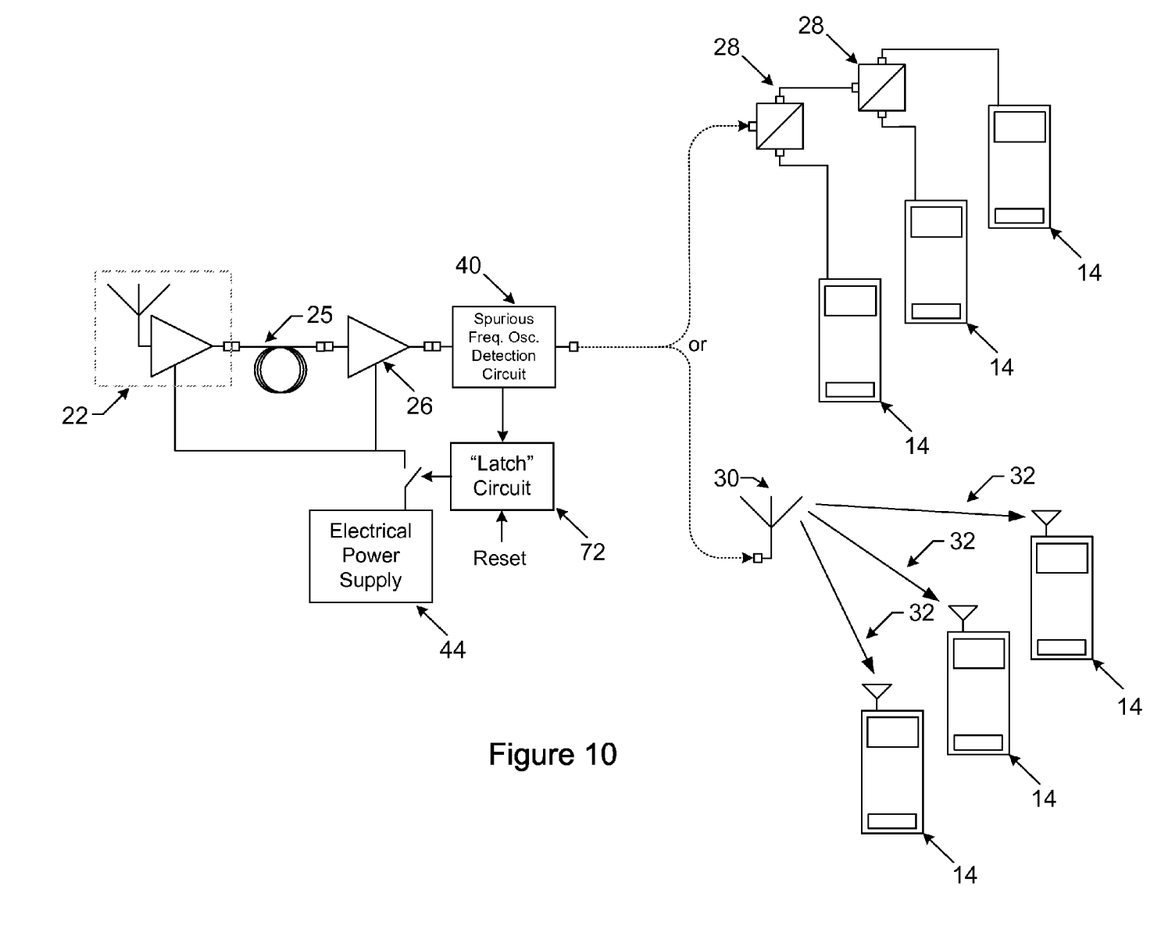
FIG. 10 illustrates an illustrative example for addressing spurious oscillations in a GNSS signal distribution network when the conditions exist for spurious oscillations to occur and a system and/or method to maintain the disabled state of the GNSS signal distribution network until the conditions for spurious frequency oscillations are removed in accordance with aspects of the present invention.

With reference to FIG. 10, a further aspect of the invention may include a memory circuit 72 that "latches" and maintains the failed state when the undesired spurious frequency oscillations are detected. Such a circuit is necessary to prevent the system from cycling repeatedly on and off. For example, when the GPS Signal Distribution system's signal amplification stages 22, 26 begin to oscillate, the detector circuit 40 detects the oscillation and removes electrical power 44 from the signal amplification stages (or shorts the amplifier or reduces the gain of one or more amplification stages), which in turn reduces or eliminates the conditions for the oscillation. Once the oscillation is reduced or eliminated, if the failed condition were not maintained or "latched", the detection circuit would restore electrical power 44 to the signal amplification stages 22, 26, whereupon the spurious frequency oscillation would return and the cycle would repeat. The inclusion of the memory circuit 72 requires those responsible for configuring, installing, or maintaining the GPS signal distribution system to correct the situation that resulted in positive feedback with greater than unity gain conditions and to reset the system.

The memory circuit 72 may or may not include a processor and storage that checks information written to the storage to determine if the oscillation condition has been addressed (by for example correcting the situation and updating the storage). Alternatively, the memory circuit 72 may include a time-delay reset, giving an operator a period of time to correct the oscillation before restoring power (or returning the gain to a previously set level).

In the example of modifying the gain of an amplifier, the gain may be restored to a previous level or may be increased (steadily, periodically, or by other ways) to a previous level. In yet a further example, the gain may be monitored to maximize its level but reducing the gain once oscillation is detected.

Figure 11:
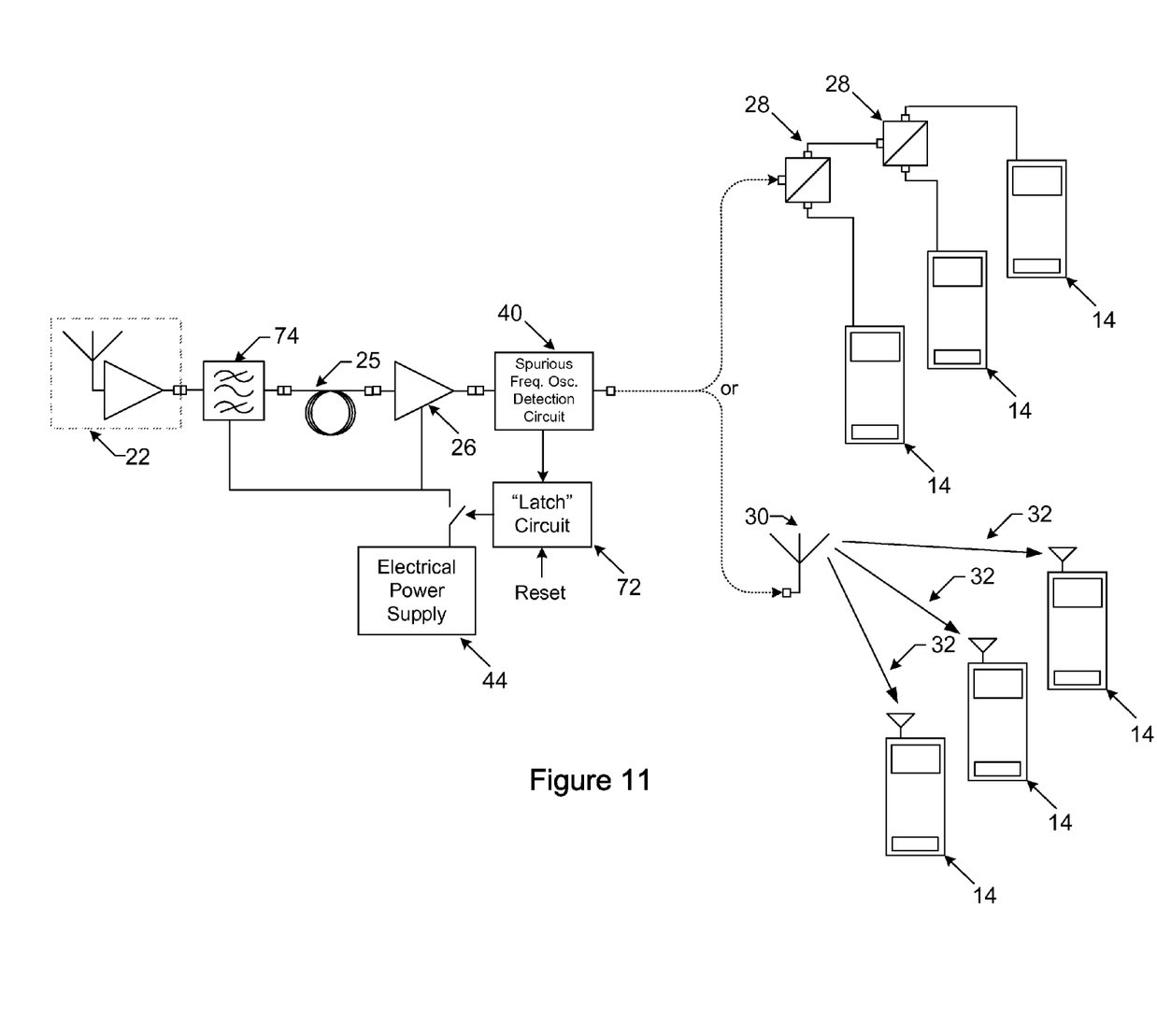
FIG. 11 illustrates another illustrative example for minimizing spurious oscillations in accordance with aspects of the present invention.

With reference to FIG. 11, a further aspect of the invention may include radio frequency selective filter circuits 72 which would serve to reduce the likelihood that conditions could exist for undesired spurious frequency oscillations outside of the desired GNSS radio frequency bands. Since the radio frequency power detector circuit that is used for detection of the spurious frequency oscillations may not be frequency selective, the detector circuit could mistakenly identify other radio frequency signals in the geographic area, such as cellular telephone transmitter signals, as undesired spurious frequency oscillations and remove power from the GPS signal amplification stages. Inclusion of frequency selective filter circuits 72 would reduce the likelihood of such signals reaching the radio frequency power detector circuit at a level sufficient to trigger the fail condition.

These and other aspects of the invention can be used to minimize or eliminate oscillations. The present invention has been described in terms of preferred and illustrative examples. Numerous other embodiments, modifications and variations within the scope and spirit of the appended claims will occur to persons of ordinary skill in the art from a review of this disclosure.

What is claimed is:

1. A method for detecting spurious frequency oscillations within a Global Navigation Satellite System (GNSS) signal distribution network, wherein Radio Frequency power levels of said spurious frequency oscillations exceed the Radio Frequency power levels of desired GNSS signals, said method comprising the steps of:
   sampling Radio Frequency signals present in GNSS signal distributing network;
   detecting power levels of said Radio Frequency signals;
   said detected Radio Frequency power levels against pre-established threshold, wherein said threshold represents a signal level greater than the signal levels to be expected in a properly operating GNSS signal distributing network; and
   outputting an indication that spurious frequency oscillations may exist within said GNSS signal distributing network.

2. The method according to claim 1, wherein said indication that spurious frequency oscillations may exist within said GNSS signal distributing network is further utilized to modify GNSS signal distributing network operation to eliminate conditions of positive feedback with greater than unity gain.

3. The method according to claim 2, wherein the state of the said indication that spurious frequency oscillations may exist within said GNSS signal distributing network is maintained.

4. The method according to claim 1, wherein said GNSS signal distribution network bandwidth is limited by radio frequency filtering.

5. The method according to claim 4, wherein said indication that spurious frequency oscillations may exist within said limited bandwidth GNSS signal distributing network is further utilized to modify GNSS signal distributing network operation to eliminate conditions of positive feedback with greater than unity gain.

6. The method according to claim 5, wherein the state of the said indication that spurious frequency oscillations may exist within said limited bandwidth GNSS signal distributing network is maintained.

7. The method according to claim 1, wherein said detecting step includes measuring said power levels.

8. A device comprising:
   a GNSS receive antenna;
   a system including an input, a first output, and a second output, the input configured to receive a GNSS signal from the GNSS receive antenna, the system configured to forward the GNSS signal to the first output, to detect spurious frequency oscillations, and to provide an indication to the second output when said spurious frequency oscillations are detected.

9. The GNSS signal distribution system, according to claim 8, further comprising:
   amplification stages.

10. The GNSS signal distribution system, according to claim 8, further comprising:
    signal divider networks.

11. The GNSS signal distribution system, according to claim 8, further comprising:
    system for further utilization of said indication output to modify said GNSS signal distributing network operation to eliminate conditions of positive feedback with greater than unity gain.

12. The GNSS signal distribution system, according to claim 11, further comprising:
    system wherein the state of said indication that spurious frequency oscillations may exist within said limited bandwidth GNSS signal distributing network is maintained.

13. The GNSS signal distribution system, according to claim 8, further comprising:
    bandwidth limiting radio frequency filtering.

14. The GNSS signal distribution system, according to claim 8, said distribution network including coaxial cables.

15. The GNSS signal distribution system according to claim 8, said distribution network including a GNSS re-radiator.

16. The GNSS signal distribution system according to claim 8, said distribution network including fiber optic transmission lines.

17. The GNSS signal distribution system according to claim 8, said distribution network including wireless transmission of frequency shifted GNSS signals.

18. A GNSS signal distribution network comprising:
    a GNSS receive antenna configured to receive GNSS signals;

a coaxial cable electrically connected to receive GNSS antenna;

a GNSS reradiator the GNSS signals; and a system configured to detect spurious frequency oscillations in the GNSS signals, said system including an output configured to output an indication when said spurious frequency oscillations are detected.

19. The GNSS signal distribution network, according to claim 18, further comprising:

amplification stages.

20. The GNSS signal distribution network, according to claim 19, further comprising:

signal divider networks.

21. The GNSS signal distribution network, according to claim 20, further comprising:

system for further utilization of said indication output to modify said GNSS signal distributing network operation to eliminate conditions of positive feedback with greater than unity gain.

22. The GNSS signal distribution system, according to claim 21, further comprising:

system wherein the state of said indication that spurious frequency oscillations may exist within said limited bandwidth GNSS signal distributing network is maintained.

23. The GNSS signal distribution system, according to claim 22, further comprising:

bandwidth limiting radio frequency filtering.

24. A GNSS signal reradiating component comprising:

an input configured to receive GNSS signals from a GNSS receive antenna;

a detector configured to detect spurious frequency oscillations in the GNSS signals;

a reradiating output, and an indication output, wherein the reradiating output is configured to output the GNSS signals, and wherein the detector is configured to output an indication to the indication output when said spurious frequency oscillations are detected.

* * * * *

UNITED STATES PATENT AND TRADEMARK OFFICE
CERTIFICATE OF CORRECTION

PATENT NO. : 7,414,574 B2
APPLICATION NO. : 11/379377
DATED : August 19, 2008
INVENTOR(S) : Robert Ray Horton et al.

It is certified that error appears in the above-identified patent and that said Letters Patent is hereby corrected as shown below:

In Column 9, Claim 18, Line 1-2:
Please delete "a coaxial cable electrically connected to receive GNSS antenna" and insert -- a coaxial cable electrically connected to the GNSS receive antenna --

In Column 9, Claim 18, Line 3:
Please delete "a GNSS reradiator the GNSS signals; and" and insert -- a GNSS reradiator configured to reradiate the GNSS signals; and --

Signed and Sealed this

Twenty-eighth Day of July, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,414,574 B2  Page 1 of 1
APPLICATION NO. : 11/379377
DATED : August 19, 2008
INVENTOR(S) : Robert Ray Horton et al.

It is certified that error appears in the above-identified patent and that said Letters Patent is hereby corrected as shown below:

In Column 7, Claim 1, Line 57:
Please replace "said detected" with --comparing said detected--

Signed and Sealed this

Twenty-sixth Day of January, 2010

David J. Kappos
*Director of the United States Patent and Trademark Office*